United States Patent Office 2,835,673
Patented May 20, 1958

2,835,673

AQUEOUS FEED PROCESS FOR SYNTHESIZING CARBON-SUBSTITUTED PIPERAZINES

William K. Langdon, Grosse Ile, Mich., assignor to Wyandotte Chemicals Corporation, Wyandotte, Mich., a corporation of Michigan No Drawing. Application February 21, 1957
Serial No. 641,495

9 Claims. (Cl. 260—268)

This invention relates to a new and improved process for synthesizing carbon-substituted piperazines. In a more specific aspect, this invention relates to a process for synthesizing carbon-substituted piperazines wherein an aqueous feed mixture is employed.

This application is a continuation-in-part of my copending application Serial No. 422,428, filed April 12, 1954, now abandoned.

Various processes have been disclosed heretofore for the synthesis of piperazine and carbon-substituted piperazines. Certain of the known processes have been based on the cyclization of an N($\beta$-hydroxyalkyl)-1,2-alkylenediamine, such as N($\beta$-hydroxypropyl)ethylenediamine, to form the corresponding piperazine derivative, 2-methylpiperazine, by heating the diamine reactant in the presence of a nickel hydrogenation/dehydrogenation catalyst. Thus, a publication by K. M. Beck et al., J. Am. Chem. Soc., 74, 605–608 (1952) discloses such a process wherein 54% of 2-methylpiperazine was obtained by heating N-(2-hydroxypropyl)ethylenediamine with Raney nickel and hydrogen at 200 p. s. i. initial pressure at 185–200° C. for 5 hours. Adaption of this reaction to commercial scale production of carbon-substituted piperazines requires a method which can be carried out continuously with a higher percentage of the desired product in the reaction effluent. A further serious problem, however, in devising a continuous process based on a catalytic hydrogenation/dehydrogenation reaction mechanism is the maintenance of good catalyst activity, or catalyst life.

An object of this invention, therefore, is to provide an improved process for synthesizing carbon-substituted piperazines.

A further object of this invention is to provide a continuous process for preparing carbon-substituted piperazines with high conversions and yields of products.

A still further object of this invention is to provide a continuous process for preparing carbon-substituted piperazines employing a nickel hydrogenation/dehydrogenation catalyst wherein decline in catalyst activity is minimized and catalyst life is lengthened while providing a higher conversion level to the desired product.

The foregoing objectives are attained by the process of this invention which is based on the surprisingly improved results one obtains by employing an aqueous mixture of the N($\beta$-hydroxyalkyl)-1,2-alkylenediamine as the feed to the process, rather than the dry diamine reactant itself. Replacement of the dry diamine reactant as the feed by an aqueous mixture of the diamine and water having as little as 5 weight percent water causes an immediate increase in the conversion level to the carbon-substituted piperazine product. In one run which I have made, the dry diamine was replaced by an aqueous mixture of the diamine containing 50 weight percent water, and the conversion level immediately arose from about 60 weight percent to over 80 weight percent. Perhaps the most important aspect of this invention, however, is the fact that the activity of the nickel catalyst is maintained at a high level when the aqueous diamine feed is used, whereas the activity of such nickel catalysts gradually declines when the dry diamine reactant is employed as the feed.

My improved process for preparing carbon-substituted piperazines can be summarized, therefore, as a method wherein a mixture of water and an N($\beta$-hydroxyalkyl)-1,2-alkylenediamine, subsequently defined, containing at least about 5 weight percent of water, is heated and continuously passed in liquid phase and in the presence of hydrogen gas over a nickel hydrogenation/dehydrogenation catalyst.

Improved conversions and lengthened catalyst life are obtained when the feed mixture contains at least about 5 weight percent water. I have made continuous runs employing a feed mixture having 50 weight percent water wherein the conversion level was about 80 to 85 weight percent to the desired carbon-substituted piperazine. Larger amounts of water can be used and the conversion level and catalyst life are maintained, but such larger amounts of water become uneconomical since no corresponding advantage is obtained by employing over 50 weight percent of water in the feed. The best balance of high conversion and catalyst life with economic considerations is obtained when the amount of water in the feed is in the range of 20 to 50 weight percent, based on the weight of the diamine-water feed mixture.

The diamine reactant used in this process is an N(2-hydroxypropyl)-1,2-alkylenediamine corresponding to the general formula, (A) 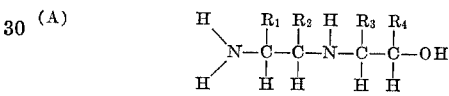

wherein $R_1$ and $R_2$ are hydrogen or alkyl radicals having 1 to 3, inclusive, carbon atoms, the total number of carbon atoms in the $R_1$ and $R_2$ substituents being not over 3. $R_3$ is hydrogen or an alkyl radical having 1 or 2 carbon atoms, and $R_4$ is an alkyl radical having from 1 to 3, inclusive, carbon atoms. The total number of carbon atoms in the alkyl radical substituents for $R_3$ and $R_4$ should not be over 3.

Thus, the N(2-hydroxyalkyl)-1,2-ethylene-, propylene-, butylene-, and amylenediamines defined by the above generic formula can be used in my process. Any such diamine reactant, or mixtures of the same, can be reacted in the process of this invention and high conversions and yields of corresponding carbon-substituted piperazines are obtained. Specific examples of diamine reactants can be named, as follows, but any diamine encompassed by the foregoing generic formula is within the scope of this invention: N(2-hydroxypropyl)ethylenediamine, N(2-hydroxypropyl)-1,2-propylenediamine, N(2-hydroxypropyl)-1,2-butylenediamine, N(2-hydroxypropyl)-1,2-amylenediamine, N(2-hydroxybutyl)ethylenediamine, N(2-hydroxybutyl)-1,2-propylenediamine, N(1-methyl-2-hydroxypropyl)ethylenediamine, N(2-ethyl-2-hydroxypropyl)-1,2-propylenediamine, N(2-hydroxyamyl)ethylenediamine, and the like.

The carbon-substituted piperazines obtained from the process of the invention correspond in structure to the structure of the diamine reactant, since the over-all reaction can be written as follows:

(B) 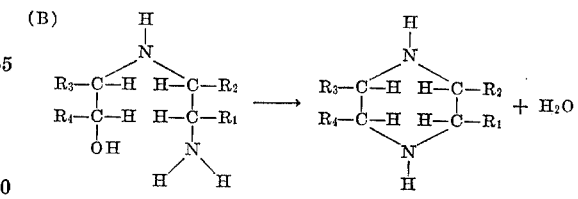

wherein $R_1$, $R_2$, $R_3$ and $R_4$ are the substituents set forth for Formula A. Examples of carbon-substituted piperazines which are obtained by the process of the invention are 2-methylpiperazine, 2,5-dimethylpiperazine, 2,6-dimethylpiperazine, 2-ethylpiperazine, 2-propylpiperazine, 2,3-dimethylpiperazine, 2-ethyl-5-methylpiperazine, 2-ethyl-6-methylpiperazine, and the like.

Any nickel hydrogenation/dehydrogenation catalyst adaptable to use in a continuous process can be used. Generally speaking, such nickel catalysts are supported catalysts and are commercially available in a wide range of activities. A common method of preparing such catalysts is to suspend a finely divided inert catalyst support such as kieselguhr, silica gel, pumice, etc., in an aqueous solution of a nickel salt such as nickel sulfate or nickel chloride and to add an aqueous solution of sodium carbonate to the vigorously agitated mixture to produce an insoluble nickel carbonate. The resulting slurry is filtered and thoroughly washed with water to remove all sulfate or chloride ions. The powdered mixture of nickel carbonate and catalyst support is dried, mixed with a lubricant and a binder, e. g. graphite and Sterotex, and pressed into pellets or other desired physical form. The pellets are heated to about 350–400° C. to convert the nickel carbonate to nickel oxide which is then reduced in a stream of hydrogen at a temperature from 325° C. to 375° C. Where the catalyst is to be cooled to room temperature and stored before use, the catalyst is stabilized to maintain its catalytic activity. A number of stabilizing techniques are used in the catalyst art, one of the most common of which is to partially reoxidize the nickel. As a result, many of the commercially-available supported nickel catalysts are actually mixed nickel-nickel oxide catalysts. Such catalysts are highly effective in the process of the present invention, but where a more highly active catalyst is desired the activity may be increased by heating the catalyst for a period of time in a slow stream of hydrogen to reduce the nickel oxide. For an excellent review of the preparation of nickel catalysts of the type that can be employed in the present invention see "Catalysis" by Berkman et al. (Reinhold Publishing Co., 330 W. 42nd Street, New York city, 1940 edition, pp. 253–263).

The nickel catalyst used in the examples reported herein was Harshaw Catalyst 0104T manufactured by Harshaw Chemical Co., Cleveland, Ohio, which is a nickel catalyst supported on kieselguhr. The catalyst contained 60 weight percent nickel and was supplied as ⅛ inch pelleted tablets. The nickel is completely reduced in the preparation of the catalyst, and is thereafter partially oxidized to stabilize the catalyst and reduce its pyrophoric characteristics.

The process of this invention is carried out by flowing the diamine-water mixture over the heated nickel catalyst in liquid phase in the presence of hydrogen gas. The process can be carried out at about atmospheric pressure and excellent conversions are obtained. I prefer to employ a positive pressure of hydrogen gas on the catalyst zone since it is believed that the activity of a nickel hydrogenation/dehydrogenation catalyst is maintained to some appreciable extent by maintaining a layer of chemically absorbed hydrogen on the surface of the nickel catalyst. The most desirable hydrogen pressure, however, depends on a number of factors, among the more important of which is the temperature at which the process is carried out. Therefore, the pressure of hydrogen can be varied widely, such as up to 1000 p. s. i. A hydrogen pressure of about 50 p. s. i. was the best for the catalyst and temperature employed in the examples reported herein.

Similarly, the temperature at which the process is carried out can be varied over a wide range. Hydrogen pressure and temperature are to some extent interdependent in this process which is explainable by noting the mechanism by which the cyclization of an N(β-hydroxyalkyl)-1,2-alkylenediamine to a corresponding carbon-substituted piperazine takes place. It is believed that the reaction proceeds through a series of steps involving dehydrogenation, dehydration and hydrogenation. The hydroxyalkylalkylenediamine reactant is probably dehydrogenated, initially, to form the corresponding ketone, which reacts in turn with the amine to form a hydrated Schiff base, which is dehydrated to form the Schiff base, with the latter being hydrogenated to form the piperazine product. Temperature influences greatly the equilibrium between the hydroxyalkyldiamine reactant and the ketone resulting from its initial dehydrogenation. At lower temperatures, excessive hydrogen pressure tends to prevent the initial dehydrogenation to a ketone from taking place, but at higher temperatures, the equilibrium is so strongly influenced toward the initial dehydrogenation reaction that even high hydrogen pressure has little or no effect. The overriding consideration in this matter is the fact that the presence of hydrogen gas is desirable in order to maintain the activity of the catalyst.

Thus, I have found that at temperatures above about 160° C., increased hydrogen pressure in the range of 200–300 p. s. i. g. actually enhanced the conversion obtained, whereas at lower temperatures, such as about 120–140° C., increased hydrogen pressure above 50 p. s. i. g. depressed the conversion obtained.

The temperature employed is generally in the range of 100 to 200° C. and I prefer that the temperature be in the range of 125 to 150° C.

The final consideration with respect to the reaction conditions for the process of the invention is the relationship between the amount of diamine reactant passed over a given amount of catalyst per unit of time. It is well recognized that the catalytic activity of nickel hydrogenation/dehydrogenation varies widely, and even varies from one batch to another of the "same" catalyst. The amount of the diamine reactant passed over any given amount of catalyst per unit time can be widely varied, to suit economic considerations. The choice of feed rate must be guided by all the reaction conditions which affect the reaction. With the Harshaw nickel catalyst 0104 employed in the examples reported herein, and under the reaction conditions found to be desirable for that catalyst, the best results were obtained by passing about 1 part by weight per hour of the diamine reactant per 4 parts by weight of catalyst employed. With a proper choice of temperature and hydrogen pressure, as disclosed hereinabove, up to 1 part by weight per hour of the diamine reactant per 2 parts by weight of the Harshaw 0104 catalyst can be passed over the catalyst, and conversions of at least 60 weight percent to the carbon-substituted piperazine product are obtained.

The terms "conversion" and "yield" employed in this specification are calculated as follows:

Percent conversion =

$$\frac{\text{Mols carbon-substituted piperazine obtained} \times 100}{\text{Mols hydroxyalkylalkylenediamine fed}}$$

Percent yield =

$$\frac{\text{Mols carbon-substituted piperazine obtained} \times 100}{\text{Mols hydroxyalkylalkylenediamine consumed}}$$

The following examples are set forth to illustrate the method of the invention, and should not be used to unduly restrict the scope of the invention as it is described herein.

EXAMPLE 1

A continuous run was carried out wherein N(β-hydroxypropyl)-ethylenediamine was converted to 2-methylpiperazine. During the run, the feed was changed from the anhydrous diamine reactant to aqueous mixtures of same and back again, so that the improvement one obtains by the method of the invention, i. e., by employing an aqueous feed as opposed to a dry feed, was clearly shown.

The run was carried out by trickling the diamine feed downwardly through a bed of the Harshaw 0104 nickel hydrogenation/dehydrogenation catalyst. The catalyst bed was contained in a 1-inch I. D. stainless steel tube reactor, and the catalyst bed was 24 inches long and weighed 310 grams. A 12-inch section of the reactor immediately above the catalyst bed was filled with inert packing to serve as a preheater for the feed to the reactor. The reactor was encased in a Dowtherm-heated jacket. Hydrogen gas was admitted to the reactor so as to maintain the indicated pressure on the system.

The run was carried out continuously under the conditions set forth in Table I below. The column heading, "Time, hours" indicates the duration of that portion of the run under which the conditions corresponding thereto prevailed.

The reaction conditions observed in runs A and B were as follows:

Pressure _____ 50 p. s. i. g.
Temperature _____ 130° C.
Feed rate _____ 50 ml./hr. (run A)
                                  100 ml./hr. (run B)

In run A, the percent conversion initially was 72 and the percent conversion gradually decreased throughout the first 150 hours of the run. At the end of 150 hours, the percent conversion was in the range of 55 to 59. Thereupon, the dry diamine reactant feed was replaced by such a feed containing 50 weight percent water, and the

*Table I*

CONVERSION OF N(β-HYDROXYPROPYL) ETHYLENEDIAMINE TO 2-METHYLPIPERAZINE EFFECT OF WATER IN FEED ON CONVERSION AND YIELD

| Sample No. | Time, hours | Pressure, p. s. i. g. | Temp., °C. | Feed Rate (approx.), ml./hr. | Feed Composition, Weight percent Water | Conversion, percent | Yield, percent |
|---|---|---|---|---|---|---|---|
| 1 | 6 | 50 | 130 | 50 | 0 | 78.0 | 83.0 |
| 2 | 3 | 50 | 130 | 100 | 0 | 71.0 | 86.0 |
| 3 | 3 | 50 | 140 | 100 | 0 | 76.5 | 81.0 |
| 4 | 6 | 50 | 140 | 50 | 0 | 74.5 | 77.6 |
| 5 | 6 | 200 | 140 | 50 | 0 | 58.5 | 76.3 |
| 6 | 6 | 200 | 140 | 67 | 25 | 72.0 | 84.2 |
| 7 | 5 | 50 | 140 | 67 | 25 | 76.6 | 82.0 |
| 8 | 4 | 50 | 140 | 50 | 0 | 66.5 | 76.9 |
| 9 | 5 | 50 | 140 | 55 | 10 | 69.5 | 78.4 |
| 10 | 3 | 50 | 140 | 100 | 50 | 80.4 | 85.3 |

The effect of water in the diamine reactant feed on the percent conversion is clearly shown in the data in Table I. Samples No. 5 and No. 6 are directly comparable in all respects except feed composition, sample No. 5 having been produced by the process using a dry feed, and sample No. 6 having been produced by the process of this invention. The increase in feed rate during the production of sample No. 6 was exactly the necessary amount to compensate for the 25 weight percent of water in the feed, so that the same quantity of diamine reactant was passed over the catalyst as before. It will be noted that the percent conversion increased from 58.5 to 72.0 due to the effect of water in the feed.

When the dry feed was resumed in the process during the production of sample No. 8, the percent conversion fell again to 66.5.

However, upon addition of only 10 weight percent water to the feed during the production of sample No. 9, the percent conversion increased again to 69.5 and increased further to 80.4 during the production of sample No. 10 wherein 50 weight percent water was present in the feed.

I have found that the water in the feed in this process has a strongly beneficial effect on the life of the nickel catalyst, also. The runs which illustrate this effect are described below in Example 2.

EXAMPLE 2

Two runs were carried out for the conversion N(β-hydroxypropyl)-ethylenediamine to 2-methylpiperazine in the apparatus and following the procedure described in Example 1. One run was made (A) employing the dry diamine reactant as the feed for the first 150 hours and then a feed having 50 weight percent water was used for the last 12 hours of the run.

The other run (B) was carried out for about 225 hours under exactly the same conditions as in run A but employing an aqueous diamine reactant feed mixture throughout, which feed mixture contained 50 weight percent water and 50 weight percent N(β-hydroxypropyl)-ethylenediamine.

percent conversion observed during the final 12 hours of the run employing the aqueous feed was about 82.

Run B employed a 50 percent aqueous feed throughout, and the overall conversion, based on isolated 2-methylpiperazine, was 80 weight percent.

Thus, the effect of water in the feed is two-fold: the percent conversion is significantly increased and the catalyst life is lengthened. Such advantages can hardly be overemphasized when a continuous process readily adaptable to commercial scale operation is concerned.

EXAMPLE 3

Another run was made for the conversion of N(β-hydroxypropyl)-ethylenediamine to 2-methylpiperazine following the general procedure of Example 1. The run was carried out at 135° C. employing the Harshaw nickel 0104 catalyst in the presence of 50 p. s. i. g. hydrogen pressure.

The run began by feeding 50 milliliters per hour of the dry N(β-hydroxypropyl)ethylenediamine through the catalyst under the conditions stated above. Analysis of product samples taken at the end of 11, 17 and 23 hours reflected that the percent conversions to 2-methylpiperazine were 61, 62 and 61, respectively.

At the end of 23 hours continuous operation, the feed was charged to a mixture of water and N(β-hydroxypropyl)ethylenediamine containing 10 weight percent water. Analysis of product samples taken thereafter at the end of 28, 34 and 44 hours reflected that the percent conversions to 2-methylpiperazine were 74, 75 and 73, respectively.

It will be observed that the objectives of this invention have been accomplished. My invention is an improved process for preparing carbon-substituted piperazines based on the surprisingly improved conversions and enhanced catalyst life one obtains when at least 5 weight percent of water is added to the N(β-hydroxyalkyl)-1,2-alkylenediamines employed as the initial reactant in this process.

I claim:

1. A continuous process for preparing carbon-substituted piperazines, which comprises, passing a liquid mixture of water and an N(β-hydroxyalkyl)-1,2-alkylenediamine, subsequently defined, over a heated nickel hydrogenation/dehydrogenation catalyst in an atmosphere of hydrogen gas, said mixture containing at least 5 weight percent of water based on the weight of said mixture, said N(β-hydroxyalkyl)-1,2-alkylenediamine corresponding to the formula

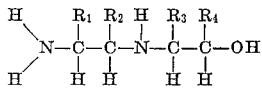

wherein $R_1$ and $R_2$ are members selected from the group consisting of hydrogen and alkyl radicals having from 1 to 3, inclusive, carbon atoms, the total number of carbon atoms in said alkyl radical substituents for $R_1$ and $R_2$ being not over 3, $R_3$ is a member selected from the group consisting of hydrogen and alkyl radicals having from 1 to 2 carbon atoms, inclusive, $R_4$ is an alkyl radical having from 1 to 3 carbon atoms, and the total number of carbon atoms in said alkyl substituents for $R_3$ and $R_4$ being not over 3.

2. A continuous process for preparing carbon-substituted piperazines, which comprises, passing a liquid mixture of water and an N(β-hydroxyalkyl)-1,2-alkylenediamine, subsequently defined, over a nickel hydrogenation/dehydrogenation catalyst under a positive pressure of hydrogen gas at a temperature in the range of 100 to 200° C., said mixture containing from 20 to 50 weight percent of water, based on the weight of the mixture, said N(β-hydroxypropyl)-1,2-alkylenediamine corresponding to the formula

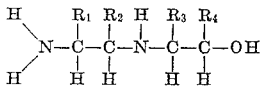

wherein $R_1$ and $R_2$ are members selected from the group consisting of hydrogen and alkyl radicals having from 1 to 3, inclusive, carbon atoms, the total number of carbon atoms in said alkyl radical substituents for $R_1$ and $R_2$ being not over 3, $R_3$ is a member selected from the group consisting of hydrogen and alkyl radicals having from 1 to 2 carbon atoms, inclusive, $R_4$ is an alkyl radical having from 1 to 3 carbon atoms, and the total number of carbon atoms in said alkyl substituents for $R_3$ and $R_4$ being not over 3.

3. A continuous process for preparing carbon-substituted piperazines, which comprises, passing a liquid mixture of water and an N(β-hydroxyalkyl)-1,2-alkylenediamine, subsequently defined, over a nickel hydrogenation/dehydrogenation catalyst under a positive pressure of hydrogen gas at a temperature in the range of 125 to 150° C., said mixture containing from 20 to 50 weight percent of water, based on the weight of said mixture, said N(β-hydroxyalkyl)-1,2-alkylenediamine corresponding to the formula

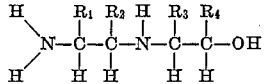

wherein $R_1$ and $R_2$ are members selected from the group consisting of hydrogen and alkyl radicals having from 1 to 3, inclusive, carbon atoms, the total number of carbon atoms in said alkyl radical substituents for $R_1$ and $R_2$ being not over 3, $R_3$ is a member selected from the group consisting of hydrogen and alkyl radicals having from 1 to 2 carbon atoms, inclusive, $R_4$ is an alkyl radical having from 1 to 3 carbon atoms, and the total number of carbon atoms in said alkyl substituents for $R_3$ and $R_4$ being not over 3.

4. A process according to claim 3 wherein said N(β-hydroxyalkyl)-1,2-alkylenediamine is N(β-hydroxypropyl)ethylenediamine.

5. A process according to claim 3 wherein said N(β-hydroxyalkyl)-1,2-alkylenediamine is N(β-hydroxypropyl)-1,2-propylenediamine.

6. A process according to claim 3 wherein said N(β-hydroxyalkyl)-1,2-alkylenediamine is N(2-hydroxybutyl)ethylenediamine.

7. A process according to claim 3 wherein said N(β-hydroxyalkyl)-1,2-alkylenediamine is N(2-hydroxybutyl)-1,2-propylenediamine.

8. A process according to claim 3 wherein said N(β-hydroxyalkyl)-1,2-alkylenediamine is N(1-methyl-2-hydroxypropyl)ethylenediamine.

9. A process for preparing 2-methylpiperazine, which comprises, passing a liquid mixture of water and N(β-hydroxypropyl)ethylenediamine over a nickel hydrogenation/dehydrogenation catalyst under a hydrogen pressure of about 50 p. s. i. g. at a temperature in the range of 125 to 150° C., said mixture containing from 20 to 50 weight percent of water based on the weight of said mixture.

No references cited.